INVENTOR:
MARCUS HAGEN
BY: *Arthur J. Hanemann*, ATTORNEY

Dec. 3, 1963  M. W. HAGEN  3,112,868
FLUID SEAL FOR ROTOR

Filed June 11, 1962  2 Sheets-Sheet 2

INVENTOR:
MARCUS HAGEN
BY: Arthur J. Hansmann
ATTORNEY

United States Patent Office 3,112,868
Patented Dec. 3, 1963

3,112,868
FLUID SEAL FOR ROTOR
Marcus W. Hagen, Kenosha, Wis.
Filed June 11, 1962, Ser. No. 201,584
12 Claims. (Cl. 230—145)

This invention relates to a rotor and seal assembly, and more particularly it relates to a fluid seal for a rotor used in a gasoline engine or like machine where sealing of a fluid is desired.

It is an object of this invention to provide a rotor and seal assembly wherein the seal extends continuously from the periphery of the rotor and along the side face thereof so that fluid cannot leak beyond the seal through a joint or other connection at the juncture of the rotor periphery and side face. In accomplishing this particular object, the seal of this invention is arranged so that it can be of course easily assembled with the rotor, but yet it has integral portions disposed at the rotor periphery and along the side face thereof, and also the seal is inverted and overlapped so that actually an endless seal is provided where no joint is available for fluid leakage.

Another object of this invention is to provide a fluid seal for a rotor, wherein the seal is extensible so that it can adjust itself to a fluid sealing relation with the adjacent wall of the rotor housing, for instance, and the adjustment can be accomplished in both the radial direction of the rotor and also the direction transverse thereto against the side wall of the rotor housing.

Still another object of this invention is to provide a one-piece type of seal which extends along the rotor periphery and also along the side of the rotor and thus the seal is more stable with respect to the rotor and will not vibrate or flutter to cause scoring of the rotor housing as is sometimes encountered in the conventional type of rotor seals which have been heretofore used.

Still another object of this invention is to provide a seal for a rotor, wherein the seal will extend itself to fluid tightly seal with the bore surrounding the rotor and to do so in accordance with the pressure applied on the rotor and thus to seal in proportion to this pressure.

Other objects of this invention include the provision of a relatively inexpensive seal which is easy to manufacture and assemble with the rotor, and wherein the elements of the seal can be readily serviced and replaced if necessary without requiring replacement of the entire seal.

Still another object of this invention is to provide a rotor and seal assembly wherein the rotor can be shaped for maximum volumetric efficiency in, for instance, the application of the invention to a rotary gasoline engine.

Other objects and advantages will become apparent upon reading the following description in light of the accompanying drawings wherein.

Figure 1:
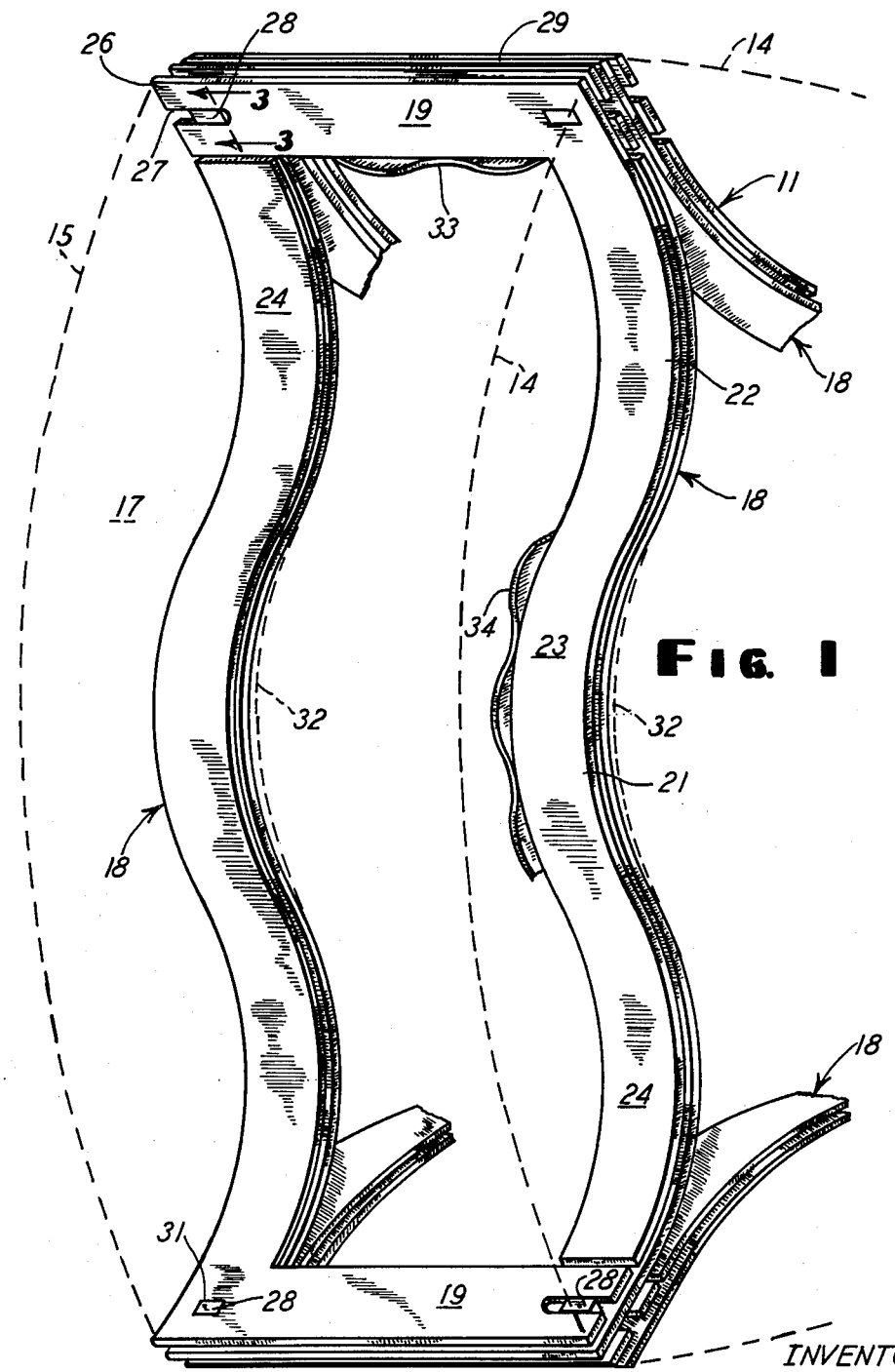
FIG. 1 is a perspective view of a fragment of the seal of this invention and showing the portion of the rotor in dotted lines.

The drawings shown the rotor and seal assembly to consist of the rotor generally designated 10 and the seal generally designated 11. The rotor is further shown to be of the type and shape used in a rotary gasoline engine in that it has three corners 12 of the common type and has the common and conventional shape shown in FIG. 2. The rotor also has radial slots 13 located on the corners or apexes 12 and of course extending across the width of the rotor between the faces or sides 14 and 15. The side faces then have serpentine-shaped slots 16 which receive at least a part of the seal 11, and of course the slots 16 extend continuously into the radial slots 13. It will also be noted that the rotor has the periphery or peripheral surfaces 17 extending between the corners 12.

The seal 11 is of course nested within the slots 13 and 16 of the rotor 10. Further, the seal 11 is comprised of a plurality of seals generally designated 18 with each member being L-shaped as clearly shown in FIG. 1. Also, the members 18 consist of a first portion 19 which is planular, and a second portion 21 which is serpentine shaped to generally nest within arcuate or serpentine-shaped slots or grooves 16 in the rotor 10. Thus, the seal leg or portion 21 consists of a first section 22, a second or intermediate section 23, and a third section 24. It will therefore be noted that the first portion 19 and the second portion 21 are continuous and integral throughout the length thereof and of course they are made of one piece of material which is of a resilient characteristic for a purpose hereinafter described.

Thus, each of the seal elements 18 is provided as described, and the elements are then disposed in laminar relation presenting layers of elements 18, and the elements are alternately inverted, such as shown in FIG. 1 with the top two elements 18. Therefore, these elements project a rectangular arrangement toward the periphery 17 of the rotor. Also, it will be noted that with two layers of four of the elements 18, there is no open joint or juncture extending therethrough transverse to the rectangular plane, and thus the seal is effective.

Figure 3:
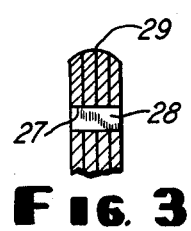
FIG. 3 is a sectional view taken along the line 3—3 of FIG. 1.

It will be further noted that the ends 26 of the seal portions 19 have slots 27 therein, and these slots receive an alignment pin 28 which extends through the several layers of the elements 18, as shown for instance in FIG. 3. FIG. 3 also shows that the peripheries 29 of the seal are arcuate for being tangentially disposed with the bore of the rotor housing (not shown) to provide the best seal with the bore. Of course in FIG. 1, the elements 18 are slightly expanded for purposes of better display and ease of presentation.

The elements 18 also have an opening 31 extending through the corner portion thereof for reception of the pin 28, all for a purpose hereinafter described.

Figure 2:
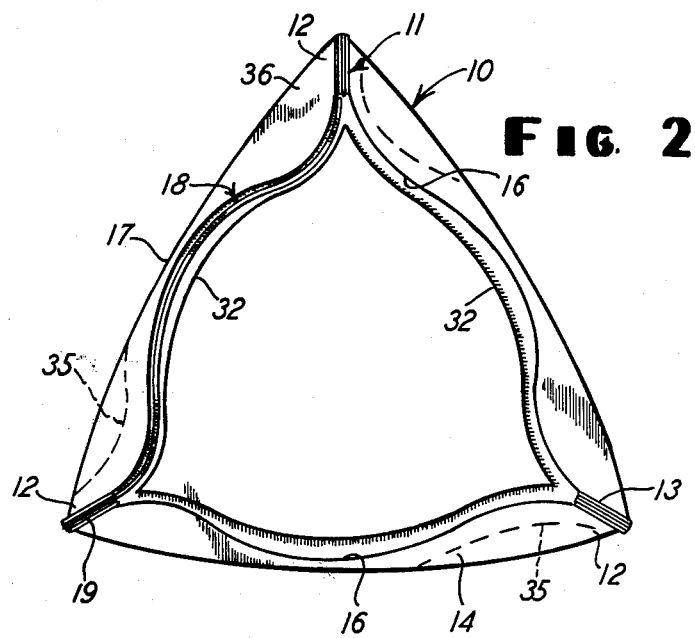
FIG. 2 is a side elevational view of the rotor and a fragment of the seal applied thereto.

FIG. 2 therefore shows how one of the elements indicated 18 extends between the radial slots 12 and along the rotor face slot 16. Also, FIG. 1 shows that two of the elements 18 extend along each of the slots 16 while of course four of the first portions 19 of the elements 18 are disposed or extend within the radial slot 12. Thus, half of the portions 21 extend along each of the rotor slots 16. This provides overlapping and complete coverage of the seal 11 around the rotor 10. It will be further understood that the pin 28 is loosely received within the opening 27 in the elements 18 so that the latter can move toward the sides 14 and 15 for extending or expanding into fluid-tight seal with the adjacent wall of the rotor housing (not shown).

FIGS. 1 and 2 further show that the rotor 10 has a relief or enlargement of its slot 16 at the central portion designated 32, and this portion extends throughout the intermediate or central portions 23 of the elements 18. Thus the fluid pressure acting downwardly in FIG. 1 on the central portion 23 of the seal will of course flatten or straighten the seal portion 21 as it is depressed toward the wall 32, and this will of course cause the seal ends 29 to become tighter with respect to the bore of the rotor housing. It will also be understood that FIG. 2 shows only one full element 18 and it shows the four portions 29 in each of the radial slots 13 in the rotor corners 12, but the portions 29 are thus only fragmentary as the remainder of the seal elements 18 is not shown.

Still further, a wavy spring 33 is disposed underneath the seal portions 29 to urge the latter radially outwardly, and another wavy spring 34 is disposed behind the seal portion 21 to urge the same outwardly in the groove 16 for sealing with the rotor housing.

Also, the rotor 10 can be relieved at the area indicated along the line 35 for maximum volumetric efficiency of the working chamber. Relief at this location in three places on the rotor 10 and extending across the rotor between the faces 14 and 15 will minimize detonation of fuel at the rotor end 36 since there will be less chamber space at end 36.

Thus the seal is continuous around the roller periphery and it also has the integral portions 19 extending across the rotor. This provided complete sealing at the points where needed. Still further, the pin 28 will permit the expansion of the seal toward the sides of the rotor, but the pin will maintain the desired position of the seal ends 29 in the direction of the rotor. Of course the operating fluid will also be permitted to enter below the seal at the location of the springs 33 and 34 to force the seal outwardly from the roller for enhancing fluid sealing.

While a specific embodiment of this invention has been shown and described, it should be obvious that certain changes could be made therein and the invention therefore should be determined only by the scope of the appended claims.

What is claimed is:

1. A seal and rotor assembly comprising a rotor for operating in a fluid and having an odd numbered plurality of radial slots equally spaced on its periphery, a plurality of L-shaped seal members each including a first portion disposed in one of said slots for fluid sealing therealong, each of said seal members including a second portion integral with said first portion and being of a length capable of extending along said rotor to another of said slots, said seal members being disposed in laminar relation and inverted with respect to each other between two adjacent layers for continuous fluid sealing at and between all said slots and along said rotor between said slots.

2. A seal and rotor assembly comprising a rotor which operates in a fluid and has an odd numbered plurality of radial slots equally spaced on its periphery and face slots on the opposite side faces thereof and extending between each two adjacent ones of said radial slots, a plurality of L-shaped seal members each including a first portion being disposed in one of said radial slots for fluid sealing therealong, each of said seal members including a second portion integral with said first portion and being disposed in one of said face slots and being of a length capable of extending along said rotor to another of said radial slots, said seal members being disposed in laminar relation and each two being inverted with respect to each other and forming a layer and disposed in said slots for fluid sealing along all said slots, said layers being alternately inverted with respect to each other and being overlapped to present a continuous fluid closure along all of said seal in the direction transverse to said layers, and said seal members being movable with respect to each other for extension outwardly from all of and between all said slots.

3. A seal and rotor assembly comprising a rotor which operates in a fluid and has an odd numbered plurality of apexes located on its periphery and a radial slot in each of said apexes and face slots on the opposite side faces thereof and extending between each two adjacent ones of said radial slots, a plurality of L-shaped seal members each including a first portion being disposed in one of said radial slots for fluid sealing therealong, each of said seal members including a second portion integral with said first portion and being disposed in one of said face slots and being of a length capable of extending along said rotor to another of said radial slots, said seal members being disposed in said slots in laminar relation and with each two thereof being inverted to present each layer thereof and with said layers being inverted with respect to the adjacent ones thereof for fluid sealing along all said slots and being overlapped to present a continuous fluid closure along all of said seal.

4. A fluid-sealed rotor comprising a rotor having an odd numbered plurality of apexes located on the periphery thereof and having a radial slot in each of said apexes and including opposite side faces each having a serpentine-shaped face slot extending therein between every two adjacent ones of said radial slots, a fluid seal consisting of a plurality of L-shaped seal members with respective legs thereof disposed in respective ones of said radial slots and said face slots and with said leg in said face slot being serpentine shaped and flexible and movable in a direction along said faces and transverse to the length of said face slot for straightening therein and extending toward said radial slots, each two of said seal members being inverted to present a layer and each said two being movable in the respective direction toward said side face, a plurality of said layers of said seal members alternately inverted, said seal members extending continuously along said side faces between every two adjacent ones of said radial slots for fluid sealing entirely along said side faces, and springs disposed in all said slots for urging said seal outwardly therefrom.

5. A seal and rotor assembly comprising a rotor having an odd numbered plurality of radial slots equally spaced on its periphery and including opposite side faces each having a face slot extending therein between every two adjacent ones of said radial slots, a fluid seal consisting of a plurality of L-shaped seal members with respective legs thereof disposed in respective ones of said radial slots and said face slots, each two of said seal members being inverted with respect to each other in a layer and each movable in the respective direction toward said side face, a plurality of said layers being alternately inverted with respect to each other, said seal members extending continuously along said side faces between every two adjacent ones of said radial slots for fluid sealing entirely along said side faces.

6. A fluid-sealed rotor comprising a rotor having a plurality of radial slots and including opposite side faces each having an arcuate face slot extending therein between every two adjacent ones of said radial slots, a fluid seal consisting of a plurality of seal members with portions thereof disposed in respective ones of said radial slots and said face slots and with said portions in said face slot being arcuately shaped and flexible and movable in a direction along said faces transverse to the length of said face slot for straightening therein and extending toward said radial slots, said seal members being arranged in inverted pairs to form a layer and with said layers being inverted and alternately disposed in overlapping relation and each movable in the respective direction toward said side face, said seal members extending continuously along said side faces between every two adjacent ones of said radial slots for fluid sealing entirely along said side faces.

7. A seal and rotor assembly comprising a rotor having a plurality of radial slots and including opposite side faces each having a face slot extending therein between every two adjacent onces of said radial slots, a fluid seal consisting of a plurality of L-shaped seal members with respective legs thereof disposed in respective ones of said radial slots and said face slots, said seal members disposed in inverted pairs to present layers and with the latter being alternately inverted and overlapped and each movable in the respective direction toward said side face, said seal members extending continuously along said side faces between every two adjacent ones of said radial slots with one-half of the number of said legs in said radial slots said face slots being on each of said side faces of said rotor for fluid sealing entirely along said side faces.

8. A seal and rotor assembly comprising a rotor having a plurality of radial slots and including opposite side faces each having a face slot extending therein and being connected between every two adjacent ones of said radial slots and being aligned with said radial slots at the place of connection therewith, a fluid seal consisting of a plurality of L-shaped seal members with respective legs thereof conforming to the shape of and being disposed in respective ones of said radial slots and said face slots, said seal members disposed in pairs of inverted ones with each pair forming a layer, said layers being inverted in alternate ones thereof to present an endless fluid seal along said layers, and means connected between said layers for restricting relative movement therebetween radially of said rotor while allowing relative movement between said seal members in the direction transverse to said side faces.

9. A seal and rotor assembly comprising a rotor having a plurality of radial slots and including opposite side faces each having a face slot extending therein and being connected between every two adjacent ones of said radial slots and terminating radially of said rotor to be aligned with said radial slots at the place of connection therewith, a fluid seal consisting of a plurality of L-shaped seal members with respective legs thereof conforming to the shape of and being disposed in respective ones of said radial slots and said face slots, said seal members disposed in pairs of inverted ones with each pair forming a layer and with the free ends of said seal members being adjacent each other, said layers being inverted in alternate ones thereof for overlapping said free ends to present an endless fluid seal along said layers, and connecting means extending between said layers of said seal members at the locations in said radial slots for restricting relative movement between said layers radially of said rotor.

10. A seal and rotor assembly comprising a rotor having an odd numbered plurality of radial slots equally spaced on the periphery of said rotor and including opposite side faces each having a face slot extending therein and being connected between every two adjacent ones of said radial slots and terminating radially of said rotor to be aligned with said radial slots at the place of connection therewith, a fluid seal consisting of a plurality of L-shaped seal members with respective legs thereof conforming to the shape of and being disposed in respective ones of said radial slots and said face slots, said seal members disposed in pairs of inverted ones with each pair forming a layer and with the free ends of said seal members being adjacent each other, said layers being inverted in alternate ones thereof for overlapping said free ends to present an endless fluid seal along said layers.

11. A seal and rotor assembly comprising a rotor having a plurality of radial slots and including opposite side faces each having a serpentine-shaped face slot extending therein and being connected between every two adjacent ones of said radial slots and being curved to terminate radially aligned with said radial slots at the place of connection therewith, a fluid seal consisting of a plurality of L-shaped seal members with respective legs thereof conforming to the shape of and being disposed in respective ones of said radial slots and said face slots, said seal members disposed in pairs of inverted ones with each pair forming a layer, said layers being inverted in alternate ones thereof to present an endless fluid seal along said layers, the radially outer edge of said layers in said radial slots being arcuate through one continuous curve, and pin means extending through said seal members in said legs thereof disposed in said radial slots for restricting relative movement between said seal members radially of said rotor while allowing relative movement between said seal members in the direction transverse to said side faces.

12. A seal and rotor assembly comprising a rotor having a plurality of radial slots and including opposite side faces each having a face slot extending therein and being connected between every two adjacent ones of said radial slots, a fluid seal consisting of a plurality of L-shaped seal members with respective legs thereof conforming to the shape of and being disposed in respective ones of said radial slots and said face slots, said seal members being of a flexible material and disposed in pairs of inverted ones with each pair forming a layer, said layers being inverted in alternate ones thereof to present an endless fluid seal along said layers, the radially outer edge of said layers in said radial slots being arcuate through one continuous curve, pin means extending through said seal members in said legs thereof disposed in said radial slots for restricting relative movement between said seal members radially of said rotor while allowing relative movement between said seal members in the direction transverse to said side faces, and spring disposed intermediate said rotor and said seal members for urging the latter outwardly of said rotor.

References Cited in the file of this patent

UNITED STATES PATENTS

| 1,528,075 | Richer | Mar. 3, 1925 |
| 1,617,863 | Planche | Feb. 15, 1927 |

FOREIGN PATENTS

| 263,161 | Italy | Mar. 7, 1929 |
| 170,178 | Switzerland | June 30, 1934 |